(12) United States Patent
Fukumoto et al.

(10) Patent No.: US 8,154,634 B2
(45) Date of Patent: Apr. 10, 2012

(54) IMAGE PROCESSING DEVICE THAT MERGES A PLURALITY OF IMAGES TOGETHER, IMAGE SHOOTING DEVICE PROVIDED THEREWITH, AND IMAGE PROCESSING METHOD IN WHICH A PLURALITY OF IMAGES ARE MERGED TOGETHER

(75) Inventors: Shimpei Fukumoto, Osaka (JP); Yukio Mori, Osaka (JP)

(73) Assignee: Sanyo Electric Col, Ltd. (JP)

( * ) Notice: Subject to any disclaimer, the term of this patent is extended or adjusted under 35 U.S.C. 154(b) by 360 days.

(21) Appl. No.: 12/468,379

(22) Filed: May 19, 2009

(65) Prior Publication Data

US 2009/0284610 A1 Nov. 19, 2009

(30) Foreign Application Priority Data

May 19, 2008 (JP) .................................. 2008-130910

(51) Int. Cl.
*H04N 5/208* (2006.01)
(52) U.S. Cl. ...................................................... 348/252
(58) Field of Classification Search .................. 348/252, 348/253, 208.13; 382/255, 256, 258, 264, 382/275
See application file for complete search history.

(56) References Cited

U.S. PATENT DOCUMENTS

| 2002/0122133 | A1 | 9/2002 | Ejima |
| 2007/0122139 | A1 | 5/2007 | Nomura et al. |
| 2008/0166115 | A1 | 7/2008 | Sachs et al. |
| 2008/0240607 | A1* | 10/2008 | Sun et al. ...................... 382/275 |
| 2008/0259175 | A1 | 10/2008 | Muramatsu et al. |
| 2008/0316334 | A1 | 12/2008 | Lee et al. |
| 2009/0167928 | A1* | 7/2009 | Asukabe et al. ............... 348/345 |
| 2009/0179995 | A1* | 7/2009 | Fukumoto et al. ........... 348/208.6 |
| 2010/0026823 | A1* | 2/2010 | Sawada ........................ 348/222.1 |

FOREIGN PATENT DOCUMENTS

| JP | 2001346093 A | 12/2001 |
| JP | 2002258351 A | 9/2002 |
| JP | 2002305682 A | 10/2002 |
| JP | 2007006021 A | 1/2007 |
| JP | 2007049374 A | 2/2007 |
| JP | 2007150802 A | 6/2007 |
| WO | 2007010891 A1 | 1/2007 |
| WO | 2007077719 | 7/2007 |

* cited by examiner

*Primary Examiner* — Jason Whipkey
(74) *Attorney, Agent, or Firm* — Novak Druce + Quigg LLP

(57) ABSTRACT

A merged image is generated by merging together a first image obtained by shooting with a reduced exposure time, a second image obtained by shooting with an increased exposure time, and a third image obtained by filtering out a high-frequency component from the first image. Here, a merging ratio at which the second and third images are merged together is determined by use of differential values obtained from the second and third images. Also, a merging ratio at which the first image and the second and third images (a fourth image) are merged together is determined by use of edge intensity values obtained from an image based on the first image.

6 Claims, 10 Drawing Sheets

DIFFERENTIAL VALUE IMAGE

FOURTH IMAGE

EDGE INTENSITY VALUE IMAGE

RESULT IMAGE

IMAGE PROCESSING DEVICE THAT MERGES A PLURALITY OF IMAGES TOGETHER, IMAGE SHOOTING DEVICE PROVIDED THEREWITH, AND IMAGE PROCESSING METHOD IN WHICH A PLURALITY OF IMAGES ARE MERGED TOGETHER

This application is based on Japanese Patent Application No. 2008-130910 filed on May 19, 2008, the contents of which are hereby incorporated by reference.

BACKGROUND OF THE INVENTION

1. Field of the Invention

The present invention relates to an image processing device that processes an inputted image, and an image shooting device having this image processing device. The present invention also relates to an image processing method for processing an inputted image.

2. Description of Related Art

Recent years have seen widespread use of image shooting devices that, in generating an image, reduce blur of the entire image (camera shake blur) attributable to motion of the image shooting device or the like and local blur (subject motion blur) attributable to motion of a subject (i.e., a shooting target such as a person) or the like. Examples of such image shooting devices include one having an image processing device that generates an image containing less blur from an inputted image and outputs the generated image. Use of such an image processing device so as to reduce blur eliminates the need of components such as a sensor for detecting and a device for reducing the motion of the image shooting device, and thus helps realize a compact and lightweight image shooting device.

For example, there have been proposed image shooting devices that generate a high-resolution high-noise image (a high-noise image) and a low-resolution low-noise image (a low-noise image) and generate one image (a merged image) by merging the two images together. Such image shooting devices calculate differential values between the two to-be merged images, and merge them together using merging ratios based on these differential values.

In particular, a region where differential values are large is recognized as a boundary between different images in an image that show different objects (which region can also be expressed as contours of an object shot in the image; hereinafter referred to as "edges"), and in this region, the proportion of the high-resolution high-noise image is increased. In contrast, a region where differential values are small is recognized as a region of one image showing one object, and in this region, the proportion of the low-resolution low-noise image is increased. Inconveniently, however, when the object is a moving object, all the region through which the object has moved is recognized as edges, and thus the merging ratios of the high-noise image become large in a wide region. As a result, an image containing much noise is outputted, and thus a disadvantageously unclear image is obtained. In addition, since the low-noise image is also a low-resolution image, contrast between edges and regions around the edges tends to be unclear. As a result, the differential values at the edges and the regions around the edges become large, and thus the merging ratios of the high-noise image become large in these parts as well. This results in an unclear merged image containing much noise.

Furthermore, it becomes difficult to accurately identify edges by distinguishing parts where the differential values are large due to noise contained in the high-noise image from parts where the differential values are large due to being edges. This difficulty may lead to erroneous recognition of the parts having large differential values due to noise as being edges, increasing merging ratios of the high-noise image to be unduly high to cause inconveniently large amount of noise to be contained all over the resulting merged image. Or, this difficulty may lead to erroneous recognition of the part having large differential values due to being edges as not being the edges, increasing merging ratios of the low-noise image at the edges to inconveniently reduce the resolution at the edges in the resulting merged image. These inconveniences cause the obtained image to be unclear.

SUMMARY OF THE INVENTION

According to one aspect of the present invention, an image processing device includes a merging portion that generates a merged image by merging together a first image obtained by shooting, a second image obtained by shooting with an exposure time that is longer than an exposure time with which the first image is shot, and a third image generated by filtering out a high-frequency component from the first image.

According to another aspect of the present invention, an image shooting device includes an image sensing portion that generates an image by shooting; and the above-described image processing device. Here, the image sensing portion generates the first image by shooting and generates the second image by shooting with an exposure time longer than an exposure time for the first image, and the image processing device generates the merged image according to the first and second images fed thereto.

According to another aspect of the invention, an image processing method includes a first step in which a third image is obtained by filtering out a high-frequency component from a first image; and a second step in which a merged image is generated by merging together the third image obtained in the first step, the first image, and a second image obtained by shooting with an exposure time longer than an exposure time for the first image.

DETAILED DESCRIPTION OF PREFERRED EMBODIMENTS

Hereinafter, descriptions will be given of embodiments of an image processing device, an image processing method, and an image shooting device according to the present invention, with reference to the accompanying drawings. The basic structure and operation of the image shooting device will be described first.

<Image Shooting Device>
Basic Structure of Image Shooting Device

Figure 1:
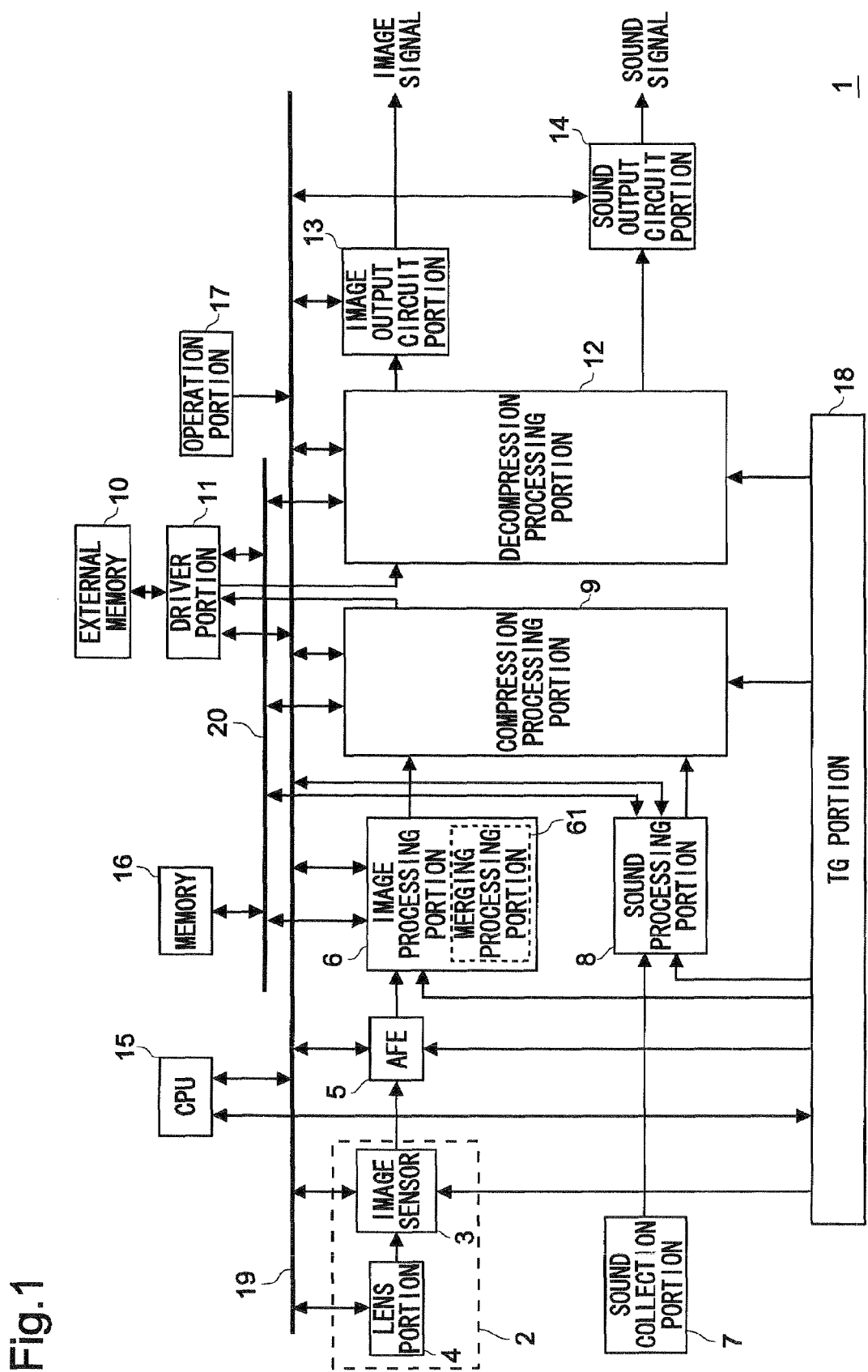
FIG. 1 is a block diagram showing the basic structure of an image shooting device embodying the present invention.

First, the basic structure of the image shooting device will be described with reference to FIG. 1. FIG. 1 is a block diagram showing the basic structure of the image shooting device embodying the present invention.

The image shooting device 1 is provided with an image sensing portion 2 having: an image sensor 3 formed as a solid-state image sensing device such as a CCD (charge coupled device) sensor or a CMOS (complementary metal oxide semiconductor) sensor that converts inputted light into electric signals; and a lens portion 4 that focuses an optical image of a subject on the image sensor 3 and adjusts the amount of light and the like.

The image shooting device 1 is further provided with: an AFE (analog front end) 5 that converts an image signal outputted from the image sensor 3 in the form of an analog signal into a digital signal; an image processing portion 6 that performs various kinds of image processing, including tone correction processing, on the image signal outputted from the AFE 5 in the form of a digital signal; a sound collection portion 7 that converts inputted sound into an electric signal; a sound processing portion 8 that converts a sound signal outputted from the sound collection portion 7 in the form of an analog signal into a digital signal, and that performs various kinds of sound processing, including noise elimination processing, on the sound signal; a compression processing portion 9 that performs compression-encoding processing for moving images, such as by an MPEG (Moving Picture Experts Group) compression method, on the image signal outputted from the image processing portion 6 and the sound signal outputted from the sound processing portion 8, and that performs compression-encoding processing for still images, such as by a JPEG (Joint Photographic Experts Group) compression method, on the image signal outputted from the image processing portion 6; an external memory 10 for recording the compressed-encoded signal compressed-encoded by the compression processing portion 9; a driver portion 11 that records the compressed-encoded signal in the external memory 10 and reads out the compressed-encoded signal from the external memory 10; and a decompression processing portion 12 that decompresses and decodes the compressed-encoded signal read out from the external memory 10 by the driver portion 11.

The image shooting device 1 is further provided with: an image output circuit portion 13 that converts an image signal obtained as a result of the decoding by the decompression processing portion 12 into an analog signal to be displayed on an unillustrated display device such as a display; and a sound output circuit portion 14 that converts a sound signal obtained as a result of the decoding by the decompression processing portion 12 into an analog signal to be played back from an unillustrated playback device such as a speaker.

The image shooting device is further provided with: a CPU (central processing unit) 15 that controls the overall operation within the image shooting device 1; a memory 16 that stores various programs for different kinds of processing and that temporarily stores data during execution of the programs; an operation portion 17, including buttons such as one for starting shooting and one for adjusting shooting conditions, via which a user inputs a command; a TG (timing generator) portion 18 that outputs timing control signals for synchronizing the operation of different portions; a bus network 19 across which data is exchanged between the CPU 15 and different blocks; and a bus network 20 across which data is exchanged between the memory 16 and different blocks.

The image processing portion 6 is provided with a merging processing portion 61 that merges together a plurality of inputted image signals to output the resulting merged signal as one image signal. The structure of the merging processing portion 61 will be described later in detail.

Although the image shooting device 1 dealt with in the above description is capable of generating both moving-image and still-image signals, the image shooting device 1 may instead be capable of generating still image signals alone. In this case, the image shooting device 1 may be structured without portions such as the sound collection portion 7, the sound processing portion 8, and the sound output circuit portion 14.

The external memory 10 may be a memory of any kind as long as image and sound signals can be recorded thereon. For example, a semiconductor memory such as an SD (secure digital) card, an optical disk such as a DVD, or a magnetic disk such as a hard disk may be used as the external memory 10. The external memory 10 may be detachable from the image shooting device 1.

Basic Operation of Image Shooting Device

Next, basic operation of the image shooting device 1 will be described with reference to FIG. 1. First, in the image shooting device 1, an image signal in the form of an electric signal is obtained as a result of photoelectrical conversion that the image sensor 3 performs on light incident thereon through the lens portion 4, and the image sensor 3 feeds the image signal to the AFE 5 at a predetermined timing in synchronism with a timing control signal fed from the TG portion 18.

The AFE 5 converts the image signal from an analog signal into a digital signal, and feeds the resulting image signal to the image processing portion 6. In the image processing portion 6, the image signal, which has R (red), G (green), and B (blue) components, is converted into an image signal having components such as a luminance signal (Y) and color-difference signals (U, V), and is also subjected to various kinds of image processing, including tone correction and edge enhancement. The memory 16 operates also as a frame memory that temporarily stores the image signal when the image processing portion 6 performs its processing.

Meanwhile, according to the image signal fed to the image processing portion 6, in the lens portion 4, positions of various lenses are adjusted to adjust focus, the degree of aperture of an aperture stop is adjusted to adjust exposure, and the sensitivity (e.g., ISO (International Organization for Standardization) sensitivity) of the image sensor 3 is adjusted. The adjustments of focus, exposure, and sensitivity are either automatically performed according to predetermined programs, or manually performed according to a user's request, so as to achieve optimal states of focus, exposure and sensitivity.

Also, in the image processing portion 6, a plurality of images are merged together by the merging processing portion 61. The operation of the merging processing portion 61 will be described later in detail.

In a case where an image signal of a moving-image is generated, sound is collected by the sound collection portion 7. The sound collected by the collection portion 7 is converted into an electric signal to be inputted to the sound processing portion 8. In the sound processing portion 8, the inputted sound signal is converted into a digital signal and is subjected to various kinds of sound processing, including noise reduction and intensity control. Then, an image signal outputted from the image processing portion 6 and a sound signal outputted from the sound processing portion 8 are both inputted to the compression processing portion 9, where the signals are compressed by a predetermined compression method. Here, the image signal and the sound signal are associated with each other in time such that there is no time lag between the image and sound in a playback. Then, a compressed-encoded signal compressed-encoded by and outputted from the compression processing portion 9 is recorded in the external memory 10 via the driver potion 11.

On the other hand, in a case where an image signal of a still image is generated, an image signal outputted from the image processing portion 6 is inputted to the compression processing portion 9, where the image signal is compressed by a predetermined compression method. Then, the compression processing portion 9 outputs a compressed-encoded signal, which is then recorded in the external memory 10 via the driver potion 11.

The compressed-encoded signal of the moving image recorded in the external memory 10 is read out by the decompression processing portion 12 at a user's request. The decompression processing portion 12 decompresses and decodes the compressed-encoded signal to generate an image signal and a sound signal; the image signal is fed to the image output circuit portion 13 and the sound signal is fed to the sound output circuit portion 14. The image and sound signals are converted into formats that allow them to be played back on the display device and the speaker, and are outputted from the image output circuit portion 13 and the sound output circuit portion 14, respectively.

On the other hand, the compressed-encoded signal of the still image recorded in the external memory 10 is fed to the decompression processing portion 12, which generates an image signal from the compressed-encoded signal. Then, the image signal is fed to the image output circuit portion 13, where the image signal is converted into a format that it to be played back on the display device.

The display device and the speaker may be integrally formed with the image shooting device 1, or may instead be separate from the image shooting device 1 and each connected with a cable or the like to a terminal provided in the image shooting device 1.

In a so-called preview mode in which an image is displayed on a display device or the like for a user to check without recording of image signals being performed, the image signal outputted from the image processing portion 6 may be fed to the image output circuit portion 13 without being compressed. In recording an image signal, the image signal is compressed by the compression processing portion 9 and recorded in the external memory 10; here, the image signal may simultaneously be fed to a display device or the like via the image output circuit portion 13

Example of Merging Processing Portion

Next, descriptions will be given of examples of the merging processing portion provided in the image processing portion 6 (image processing device) shown in FIG. 1. In the descriptions below, one of the two image signals merged together by the merging processing portion 61 will be referred to as "first image", and the other will be referred to as "second image". An image signal obtained as a result of the merging processing will be referred to as "result image". Incidentally, for a concrete description of the examples, these image signals will be expressed as images in the following descriptions.

First Example

Figure 2:
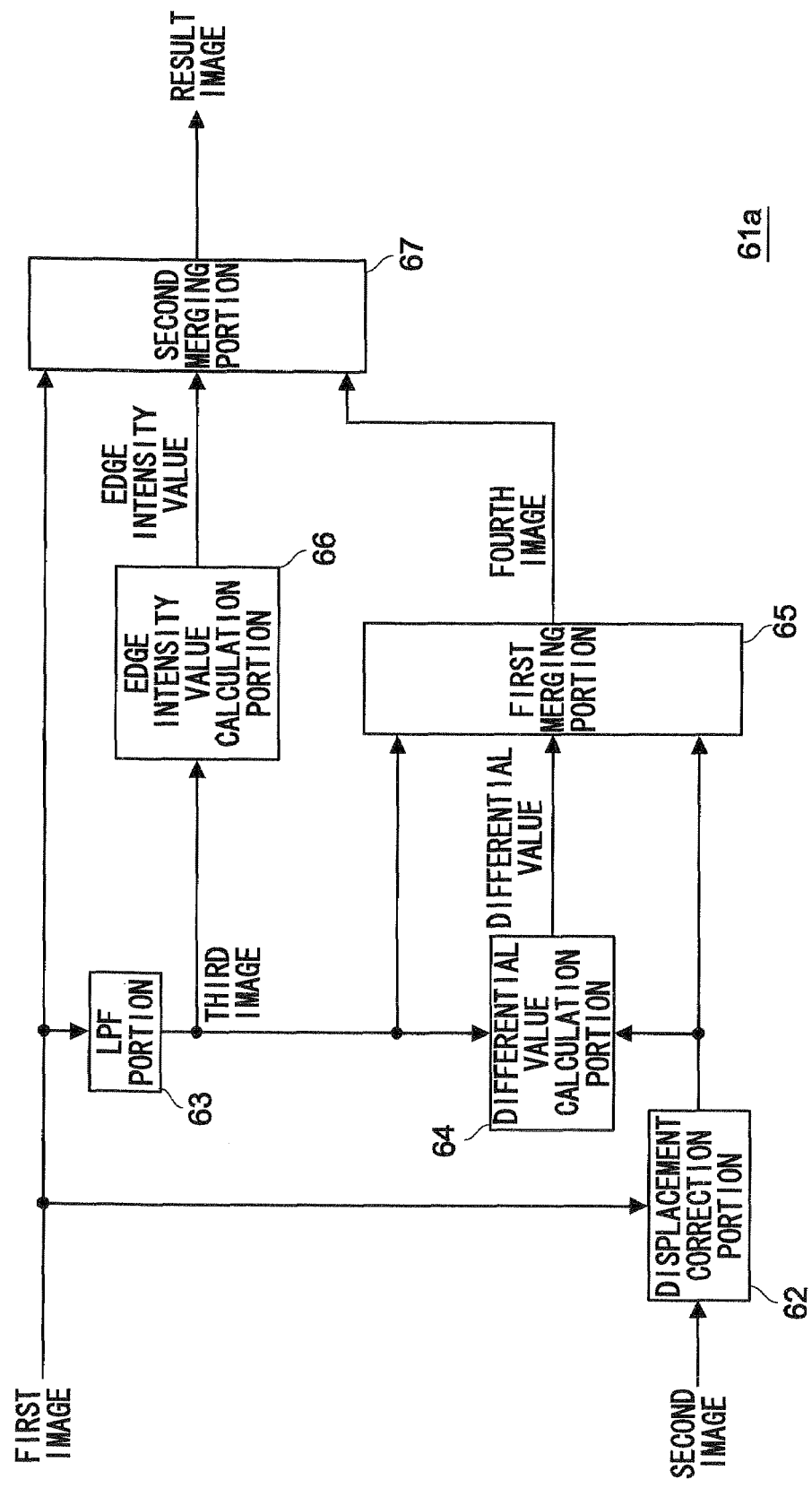
FIG. 2 is a block diagram showing the structure of a first example of a merging processing portion of the image shooting device embodying the present invention.

First, the structure of the first example of the merging processing portion will be described with reference to FIG. 2. FIG. 2 is a block diagram showing the structure of the first example of the merging processing portion of an image shooting device embodying the present invention.

As shown in FIG. 2, a merging processing portion 61a of this example is provided with: a displacement correction portion 62 that corrects displacement in a second image according to a first image; an LPF (low pass filter) portion 63 that filters out a high-frequency component having a frequency equal to or higher than a predetermined frequency from a spatial frequency of the first image to generate and output a third image; a differential value calculation portion 64 that find differences between the second image having undergone displacement correction and the third image to calculate differential values; a first merging portion 65 that merges together the third image and the second image on which displacement correction has been performed by the displacement correction portion 62 according to the differential values to generate and output a fourth image; an edge intensity value calculation portion 66 that extracts edges from the third image to calculate edge intensity values; and a second merging portion 67 that merges the first and fourth images together according to the edge intensity values to generate and output a result image.

Figure 3:
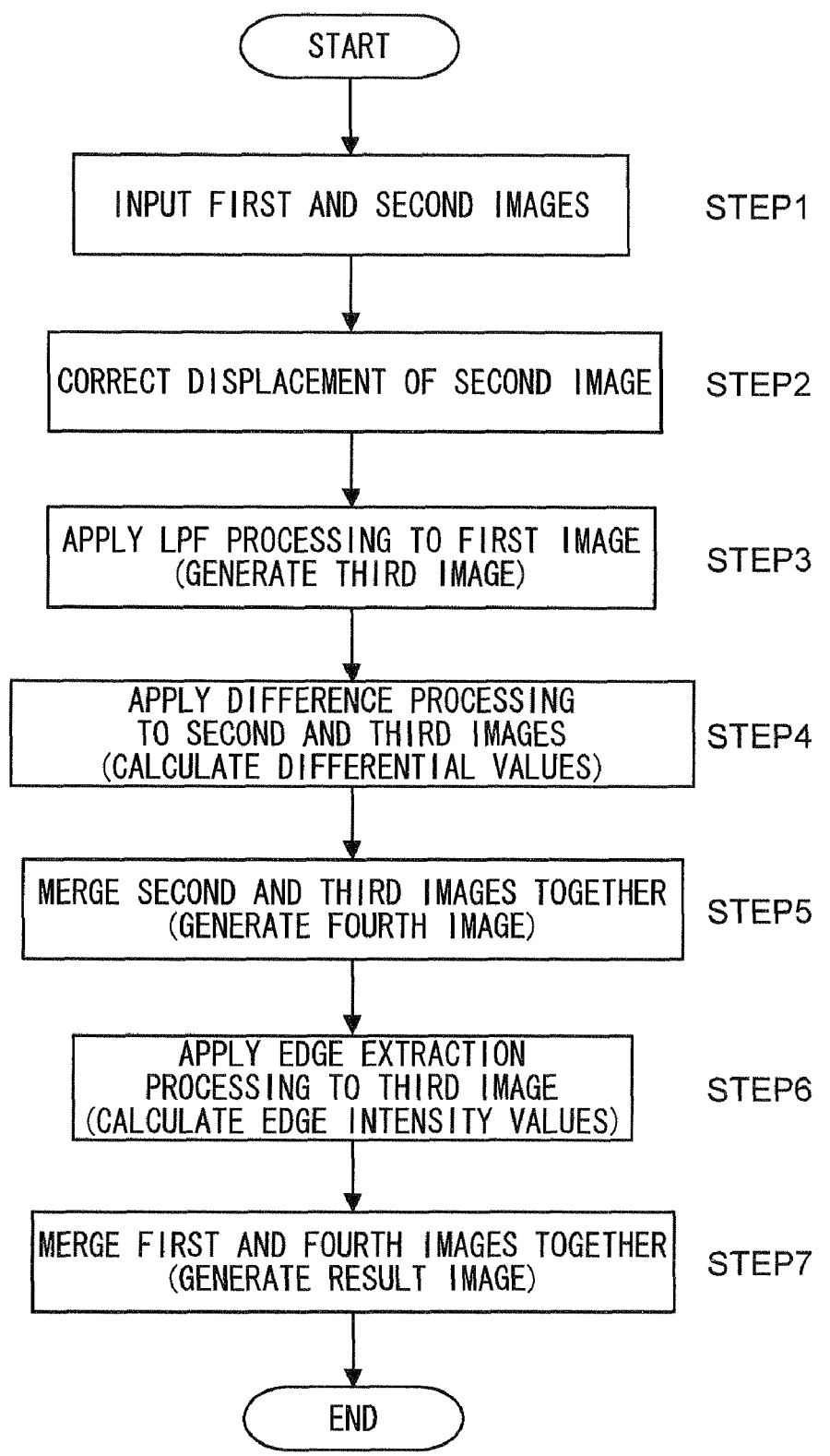
FIG. 3 is a flow chart showing the operation of the first example of the merging processing portion of the image shooting device embodying the present invention.

Next, the operation of the merging processing portion 61a will be described with reference to FIG. 3. FIG. 3 is a flow chart showing the operation of the first example of the merging processing portion of the image shooting device embodying the present invention.

As shown in FIG. 3, first, the first and second images are inputted to the merging processing portion 61a (STEP 1). The second image is an image shot with an exposure time that is longer than a exposure time with which the first image is shot. Sensitivity of the image sensor 3 is lower when the second image is generated than it is when the first image is generated. The thus set exposure time and sensitivity allow the first and second images to be adjusted to have substantially equal brightness. The first and second images are consecutively shot and generated, and whichever one of them may be generated first.

The exposure time of the first image is preferably shorter than a camera shake limit exposure time (1/f sec when the focal length is "f" mm, which is here the longest possible exposure time that allows shooting with hardly any camera shake). In this way, the first image generated in this way contains less camera shake blur due. Furthermore, since the exposure time is short, subject motion blur is also reduced. As a result, the first image can be an image with sharp edges. Here, however, since the sensitivity of the image sensor 3 needs to be high, the first image tends to contain much noise.

In contrast, for the second image, the exposure time is set longer than that for the first image and the sensitivity of the image sensor 3 is set lower than for the first image, and as a result, noise contained in the second image is reduced. However, since more camera shake and motion of the subject are likely to occur during the long exposure time, edges in the second image tends to be blurred.

After STEP 1, displacement between the first and second images is corrected by the displacement correction portion 62 (STEP 2). Since the first and second images are consecutively shot and generated as already mentioned, regions shot in the two images are substantially equivalent. However, since the first and second images are not shot and generated completely simultaneously, there may be slight displacement between the regions shot in the two images.

Here, for example, "displacement" is found by searching for a position at which the first and second images are substantially equal. Then, according to the thus found "displacement", the coordinates of pixels in the second image are converted, and thereby correction is performed such that the coordinates of a pixel in the first image and those of a pixel in the second image are substantially equal when the pixels show the same object. That is, processing is performed such that a pixel in the first image and a pixel in the second image have the same coordinates if they show the same object.

Figure 4A:
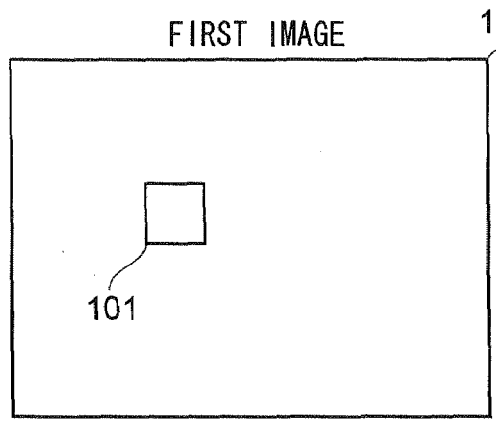
FIG. 4A is a schematic diagram of a first image for illustrating a block matching method.
Figure 4B:
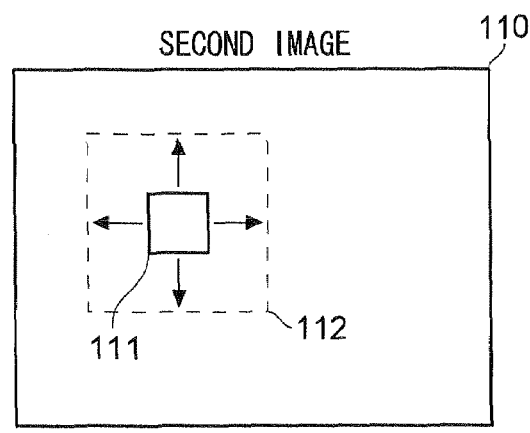
FIG. 4B is a schematic diagram of a second image for illustrating the block matching method.

Examples of the method of searching for a part at which the first and second images are substantially equivalent in STEP 2 include various methods of finding an optical flow and a representative point matching method. Here, to show an example of how such searching is performed, a description will be given of a case where a block matching method, which is a method of finding an optical flow, is adopted, with reference to FIGS. 4A and 4B. FIGS. 4A and 4B are schematic diagrams for illustrating a block matching method.

In FIG. 4A, reference numeral 100 denotes the first image and reference numeral 101 denotes an attention-focused block in the first image. In FIG. 4B, reference numeral 110 denotes the second image, reference numeral 111 denotes a candidate block in the second image, and reference numeral 112 denotes a search block where the candidate block 111 can be located.

The displacement correction portion 62 calculates a correlation value between the attention-focused block 101 and the candidate block 111. Here, the candidate block 111 is moved within the search block 112 by one pixel at a time in a horizontal or vertical direction, and the correlation value is calculated each time the candidate block 111 is moved. The correlation value may be, for example, a sum of absolute values of differences in brightness between corresponding pixels in the attention-focused block 101 and the candidate block 111. This correlation value is generally called SAD (sum of absolute difference). Or, instead, a sum of squared differences (SSD: sum of squared difference) in brightness may be used as the correlation value.

The correlation value is smaller where an image of the attention-focused block 101 and an image of the candidate block 111 show higher correlation with each other. Thus, finding the location of the candidate block 111 where the correlation value is the smallest results in finding not only the location of a block in the second image showing an image substantially equivalent to the image shown by the attention-focused block 101, but also motion vectors of the attention-focused block 101 between the first and second images (i.e., an optical flow, indicating the direction and magnitude of displacement between the first and second images). In this way, "displacement" can be found according to the thus obtained motion vectors.

Figure 5A:
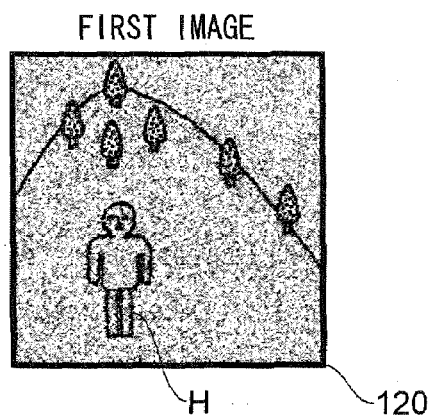
FIG. 5A is a schematic diagram showing an example of the first image.
Figure 5B:
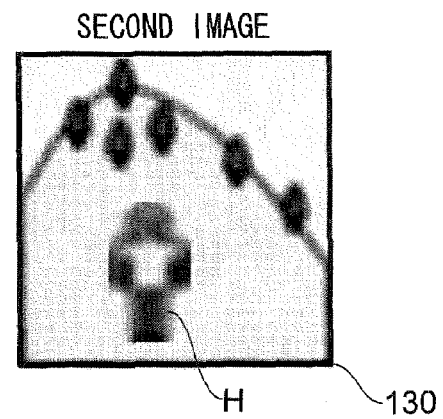
FIG. 5B is a schematic diagram showing an example of the second image.

An example of the first image and an example of the second image obtained after the displacement correction in STEP 2 will be described with reference to FIG. 5. FIG. 5A is a schematic diagram showing an example of the first image, and FIG. 5B is a schematic diagram showing an example of the second image. First and second images 120 and 130 shown as examples in FIG. 5 have been obtained by shooting a subject (a person) H standing before a mountain in the background. FIG. 5A shows the first image 120 and FIG. 5B shows the second image 130 after the displacement correction.

Compared with the second image 130 shown in FIG. 5B, the first image 120 shown in FIG. 5A has clearer edges, but contains more noise (which appears as black dots giving the image a rough appearance). FIG. 5 shows a case where the subject H moves during the time period from the start of the shooting of the first image 120 and to the end of the shooting of the second image 130. Specifically, the subject H is located closer to the right side in the second image 130 than in the first image 120, and thus subject motion blur (blur due to the motion of the subject H) has occurred in the second image 130.

After STEP 2, the LPF portion 62 performs LPF processing on the first image 120 to generate a third image (STEP 3). Here, the LPF portion 62 filters out a part having a high spatial frequency from the first image 120 (that is, noise is reduced). A cutoff frequency of the LPF portion 62 is set to such a value that noise reduction does not cause edges to be extremely blurred (specifically, to such a value that edges can be clearly extracted by the edge intensity value calculation portion 66, which will be described later).

Figure 6:
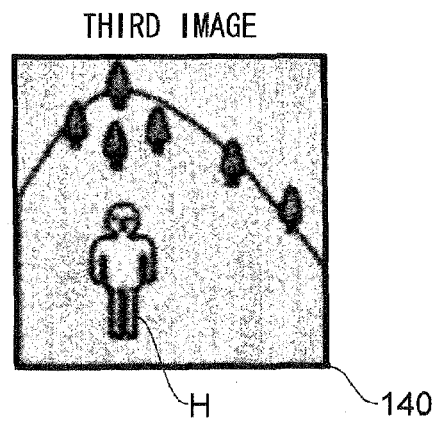
FIG. 6 is a schematic diagram showing an example of a third image.

An example of the third image generated in STEP 3 will be described with reference to FIG. 6. FIG. 6 is a schematic diagram showing an example of the third image. As shown in FIG. 6, the third image 140 is generated by reducing the noise contained in the first image 120, and the edges therein are slightly more blurred than those in the first image 120. Incidentally, although STEP 3 is performed after STEP 2 in the example shown in FIG. 3, STEP 3 may be performed before STEP 2, or STEP 2 and STEP 3 may be concurrently performed.

After STEP 3, the second and third images 130 and 140 are subjected to difference processing in the differential value calculation portion 64, and differential values are calculated (STEP 4). A differential value is a value indicating difference in color or brightness between corresponding pixels in two images, and the differential value of the pixel (x, y) is described as differential value D(x, y). For example, differential value D(x, y) can be calculated by using formula (1) below. Incidentally, "x" represents the location (coordinate) of a pixel in the horizontal direction in an image, and "y" represents the location (coordinate) of the pixel in the vertical direction in the image.

$$D(x,y)=|P2(x,y)-P3(x,y)| \qquad (1)$$

In formula (1), P2(x, y) represents a signal value of the pixel(x, y) in the second image 130, P3(x, y) represents a signal value of the pixel(x, y) in the third image 140, and D(x, y) represents, as already mentioned, the differential value obtained from these signal values.

Specifically, for example, the differential value D(x, y) may be calculated according to formula (1a) below. Formula (1a) represents a case where signal values of R, G, and B components are used as the signal values P2(x, y) and P3(x, y) of the pixels(x, y) in formula (1). In Formula (1a), the signal values of the R, G, and B components of the pixel(x, y) in the second image 130 are represented by $P2_R(x, y)$, $P2_G(x, y)$, and $P2_B(x, y)$, respectively; and the signal values of the R, G, and B components of the pixel(x, y) in the third image 140 are represented by $P3_R(x, y)$, $P3_G(x, y)$, and $P3_B(x, y)$, respectively. In the calculation method shown by formula (1a), the differential value D(x, y) is obtained by separately calculating absolute values of the differences of the R, G, and B components and then adding up the absolute values.

$$D(x, y) = |P2_R(x, y) - P3_R(x, y)| + \\ |P2_G(x, y) - P3_G(x, y)| + |P2_B(x, y) - P3_B(x, y)| \qquad (1a)$$

Or instead, for example, the differential value D(x, y) may be calculated according to formula (1b) below. Formula (1b), too, represents a case where the signal values of the R, G, and B components are used and the signal values are represented in the same manner as in formula (1a). According to formula (1b), the differential value D(x, y) is obtained by squaring the difference of each of the R, G, and B components, adding up the results to a sum, and raising the sum to the one-half power.

$$D(x, y) = \begin{bmatrix} \{P2_R(x, y) - P3_R(x, y)\}^2 + \\ \{P2_G(x, y) - P3_G(x, y)\}^2 + \\ \{P2_B(x, y) - P3_B(x, y)\}^2 \end{bmatrix}^{\frac{1}{2}} \qquad (1b)$$

The above methods shown by formulae (1), (1a), and (1b) are merely presented as examples, and the differential value D(x, y) may be calculated by using other methods. Furthermore, the differential value D(x, y) may be calculated by using the values of the Y, U, and V components instead of those of the R, G, and B components in the same methods in which the values of the R, G, and B components are used (that is, by substituting the signal values of the Y, U, and V components for the signal values of the R, G, and B components). Moreover, the differential value D(x, y) may be calculated according to the signal values of the Y components alone of the second and third images 130 and 140.

Figure 7:
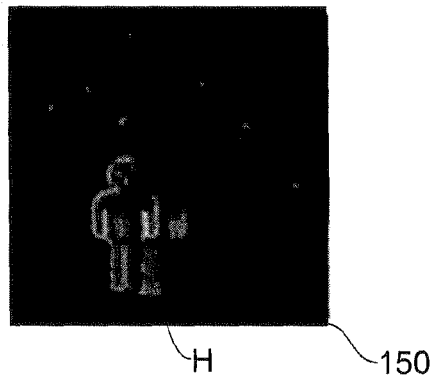
FIG. 7 is a schematic diagram showing a differential-value image representing an example of differential values in the form of an image.

Examples of the differential value calculated in STEP 4 will be described with reference to FIG. 7. FIG. 7 is a schematic diagram of a differential-value image expressing examples of the differential value in the form of an image. In the differential-value image 150 shown in FIG. 7, a position at which the differential value D(x, y) is large is white, while a position at which the differential value D (x, y) is small is black. The subject H has moved in the first and second images 120 and 130, differential values D (x, y) in the region across which the subject H has moved are large. In addition, the second image 130 contains blur, and thus differential values D (x, y) near edges are slightly large.

Figure 8:
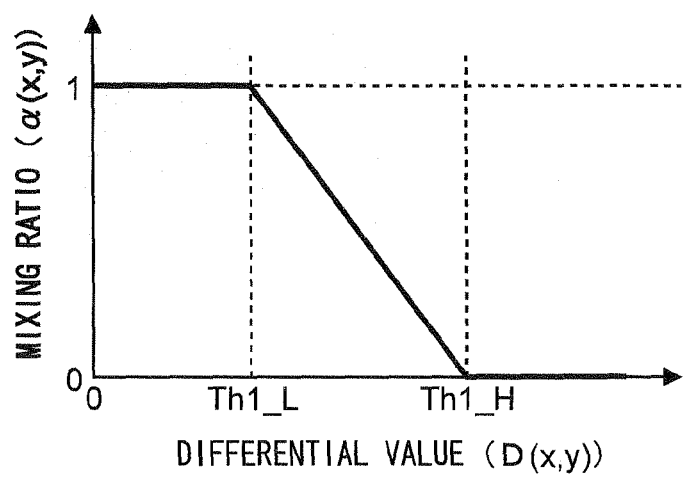
FIG. 8 is a graph showing an example of how merging is performed by a first merging portion.

After STEP 4, in the first merging portion 65, the second and third images 130 and 140 are merged together to generate a fourth image (STEP 5). Here, for example, the merging can be achieved by performing weighted addition of the second and third images 130 and 140. An example of the case where merging is performed by weighted addition will be described with reference to FIG. 8. FIG. 8 is a graph showing an example of how merging is performed by the first merging portion.

As shown in FIG. 8, in the method of this example, a mixing ratio a(x, y) is determined according to the differential value D(x, y), and weighted addition is performed according to the mixing ration a(x, y). Specifically, according to formula (2) below, the second and third images 130 and 140 are merged together.

$$P4(x,y) = \alpha(x,y) \times P2(x,y) + \{1 - \alpha(x,y)\} \times P3(x,y) \qquad (2)$$

The mixing ratio a(x, y) represents an addition ratio (merging ratio) that is used in weighted addition of the signal value P2(x, y) of a pixel at position (x, y) in the second image 130 and the signal value P3(x, y) of a pixel at position (x, y) in the third image 140. Incidentally, the mixing ratio a(x, y) represents the addition ratio of the second image 130, and thus the addition ratio of the third image 140 is represented by "1−a(x, y)".

The mixing ratio a(x, y) is "1" when the differential value D(x, y) is smaller than a threshold value Th1_L, "0" when the differential value D(x, y) is equal to or larger than a threshold value Th1_H, and "1−(D(x, y)−Th1_L/(Th1_H−Th1_L)" when the differential value D(x, y) is equal to or larger than the threshold value Th1_L and smaller than the threshold value Th1_H. That is, as the differential value D(x, y) is increased from the threshold value Th1_L to the Th1_H, the mixing ratio a(x, y) is linearly reduced from "1" to "0". Incidentally, although the mixing ratio a(x, y) may be non-linearly reduced, it is preferable that the mixing ratio a(x, y) be monotonously reduced.

Thus, through weighted addition shown by formula (2), a signal value P4(x, y) of a pixel at position(x, y) in the fourth image is obtained. Incidentally, in a case where the signal values of the Y, U, and V components are used as the signal values P2(x, y) of the pixel in the second image and P3(x, y) of the pixel in the third image, calculation may be performed separately with each of the Y, U, and V components to obtain the signal value P4(x, y) of the pixel in the fourth image. Or, instead of the signal values of the Y, U, and V components, those of the R, G, and B components may be used.

Figure 9:
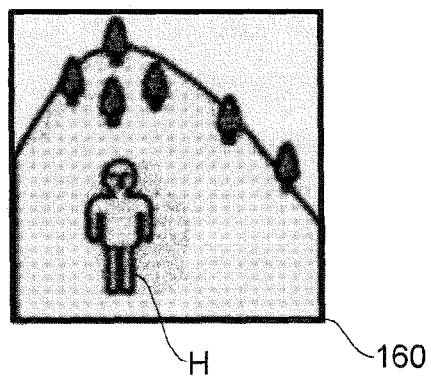
FIG. 9 is a schematic diagram showing an example of a fourth image.

Now a description will be given of an example of the fourth image obtained in STEP 5 with reference to FIG. 9. FIG. 9 is a schematic diagram showing an example of the fourth image. As described above, in the region where the subject H has moved, differential values D(x, y) are large, and accordingly addition ratios "1−a(x, y)" of the third image 140 are large. As a result, in the fourth image 160, subject motion blur contained in the second image 130 is greatly reduced.

Differential values D(x, y) are large near edges as well, and accordingly addition ratios "1−a(x, y)" of the third image 140 are large. As a result, the edges in the fourth image are slightly clearer than in the second image 130. However, the edges in the third image 140 are slightly more blurred than those in the first image, and accordingly, so are the edges in the fourth image 160.

On the other hand, at a position where the differential value D(x, y) is small, the addition ratio a(x, y) is large. As a result, in the fourth image 160, noise from the third image 130, which is of a small amount, is further reduced. Even at a position where the differential value D(x, y) is large and thus the addition ratio a(x, y) of the second image 130 is small, since the third image 140 contains only a small amount of noise, the noise from the third image 140 is reduced at least to an unnoticeable extent.

After STEP 5, in the edge intensity value calculation portion 66, edge extraction processing is performed on the third image 140, and the edge intensity value is calculated (STEP 6). The edge intensity value is a value indicating variation of pixels (variation between a pixel and an adjacent pixel), and here the edge intensity value at the pixel(x, y) is represented by E(x, y). For example, the edge intensity value E(x, y) at the pixel(x, y) can be obtained by using formula (3) below.

$$E(x, y) = \left| \sum_{i=-1}^{1} \sum_{j=-1}^{1} Fx(i, j) \cdot P3_Y(x+i, y+j) \right| + \left| \sum_{i=-1}^{1} \sum_{j=-1}^{1} Fy(i, j) \cdot P3_Y(x+i, y+j) \right| \quad (3)$$

In formula (3), $P3_Y(x, y)$ represents the signal value of the Y component of the pixel(x, y) in the third image 130. Incidentally, when signal values of the R, G, and B components are used as the signal value of a pixel, there may be used a value corresponding to the signal value of the Y component calculated by using the signal values of the R, G, and B components.

Fx(i, j) and Fy(i, j) represent filters for extracting edges, that is to say, filters that enhances edges in an image. As such filters, for example, differential filters such as a Sobel or Prewitt filter can be used. Formula (3) represents, as an example, a case where a 3-by-3 filter is used. Fx(i, j) is a filter for extracting edges in the x direction (horizontal direction) and Fy(i, j) is a filter for extracting edges in the y direction (vertical direction).

When a Prewitt filter is used as a filter for extracting edges, Fx(i, j) may be set such that Fx(−1, −1)=Fx(−1, 0)=Fx(−1, 1)=−1, Fx(0, −1)=Fx(0, 0)=Fx(0, 1)=1, and Fx(1, −1)=Fx(1, 0)=Fx (1, 1)=1, and Fy(i, j) may be set such that Fy (−1, −1)=Fy(0, −1)=Fy(1, −1)=−1, Fy(−1, 0)=Fy(0, 0)=Fy(1, 0)=0, and Fy(−1, 1)=Fy(0, 1)=Fy(1, 1)=1.

The edge intensity value E(x, y) of the pixel(x, y) as shown by formula (3) can be obtained by adding the absolute values of the following values: a value obtained by multiplying the signal value of the Y component of each pixel in the 3-by-3 region around and including the pixel(x, y) by a value of a corresponding element of the 3-by-3 filter Fx(i, j) located in the same position and then summing up the resulting products; and a value obtained by multiplying the signal value of the Y component of each pixel in the 3-by-3 region around and including the pixel(x, y) by a value of a corresponding element of the 3-by-3 filter Fy(i, j) located in the same position and then summing up the resulting products. The method shown by formula (3) is just an example, and thus the edge intensity value E (x, y) may be obtained by using other methods. Incidentally, although FIG. 3 shows a procedure in which STEP 6 is performed after STEP 4 and STEP 5, it is also possible to perform STEP 6 before STEP 4 and STEP 5, or to concurrently perform STEP 6 and STEPs 4 and 5. Furthermore, it is also possible to perform STEP 6 before STEP 2, or to concurrently perform STEP 6 and STEP 2, but in whichever case, STEP 6 should be performed after STEP 3.

Figure 10:
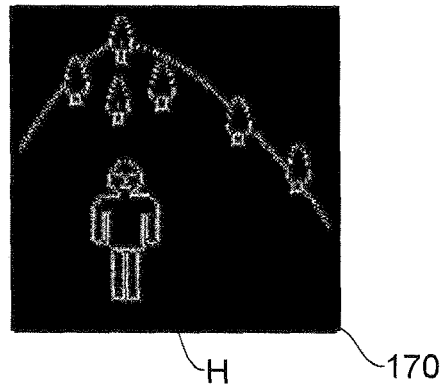
FIG. 10 is a schematic diagram showing an example of an edge-intensity value image representing an example of edge intensity values in the form of an image.

Now a description will be given of an example of the edge intensity value obtained in STEP 6 with reference to FIG. 10. FIG. 10 is a schematic diagram showing an example of an edge-intensity value image representing an example set of edge intensity values in the form of an image. In the edge intensity value image 170 shown in FIG. 10, a position at which the edge intensity value E (x, y) is large is shown in white, while a position at which the edge intensity value E(x, y) is small is shown in black. The edge intensity value E(x, y) is obtained by extracting edges in the third image 140 generated by reducing the noise contained in the first image 120 having clear edges. As a result, noise can be easily distinguished from edges of the subject H and of the background, and this makes it possible to extract edges clearly. The edge intensity value E(x, y) is large in edges and small in regions other than the edges.

Figure 11:
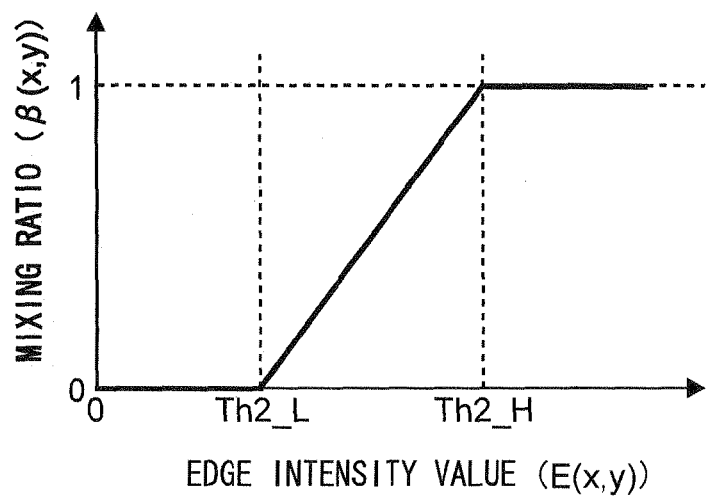
FIG. 11 is a graph showing an example of how merging is performed by a second merging portion.

After STEP 6, in the second merging portion 67, the first image 120 and the fourth image 160 are merged together, and thereby a result image is generated (STEP 7). Here, for example, the first image 120 and the fourth image 160 can be merged together by use of weighted addition. An example of a case where the merging is achieved by use of weighted addition will be described with reference to FIG. 11. FIG. 11 is a graph showing an example of how merging is performed by the second merging portion 67.

As shown in FIG. 11, with the method of this example, a mixing ratio β(x, y) is determined according to the edge intensity value E(x, y), and according to the mixing ratio β(x, y), weighted addition is performed. Specifically, the first image 120 and the fourth image 160 are merged together according to formula (4) below.

$$P(x,y)=\beta(x,y) \times P1(x,y)+\{1-\beta(x,y)\} \times P4(x,y) \quad (4)$$

The mixing ratio β(x, y) represents an addition ratio (a merging ratio) to be used in weighted addition of a signal value P1(x, y) of a pixel at position (x, y) in the first image 120 and a signal value P4(x, y) of a pixel at position (x, y) in the fourth image 160. The mixing ratio β(x, y) represents the addition ratio of the first image 120, and thus the addition ratio of the fourth image 160 is represented by "1−β(x, y)".

The mixing ratio β(x, y) is "0" when the edge intensity value E(x, y) is smaller than a threshold value Th2_L, the mixing ratio β(x, y) is "1" when the edge intensity value E (x, y) is equal to or larger than a threshold value Th2_H, and the mixing ratio β(x, y) is "E(x, y)−Th2_L/(Th2_H−Th2_L)" when the edge intensity value E(x, y) is equal to or larger than the threshold value Th2_L and smaller than the threshold value Th2_H. That is, as the edge intensity value E (x, y) is increased from the threshold value Th2_L to the Th2_H, the mixing ratio β(x, y) is linearly increased from 0 to 1. Incidentally, although the mixing ratio β(x, y) may be non-linearly increased, it is preferable that the mixing ratio β(x, y) be monotonously increased.

Thus, through the weighted addition shown by formula (4), a signal value P (x, y) of a pixel at position (x, y) in the merged image is obtained. In a case where the signal values of the Y, U, and V components are used as the signal values P1(x, y) and P4(x, y) of pixels in the first and fourth images, calculation may be separately performed with each of the Y, U, and V components to obtain the signal value P(x, y) of the pixel in the merged image. Or, instead of the signal values of the Y, U, and V components, those of the R, G, and B components may be used.

Figure 12:
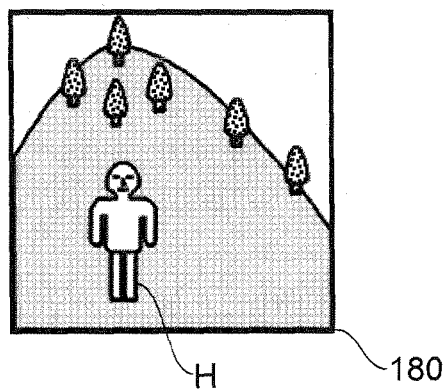
FIG. 12 is a schematic diagram showing an example of a result image.

Now a description will be given of an example of the result image obtained in STEP 7 with reference to FIG. 12. FIG. 12 is a schematic diagram showing an example of the result image. As described above, in edges, the edge intensity value E(x, y) is large, and accordingly the addition ratio β(x, y) of the first image 120 is large. As a result, slightly blurred edges in the fourth image 160 are improved in the result image 180, and thus the edges in the result image 180 are clear.

In contrast, in parts other than edges, the edge intensity value E(x, y) is small, and accordingly the addition ratio 1 minus B(x, y) of the fourth image is large. As a result, the result image 180 less reflects the noise contained in the first image 120.

Thus, the merging of the first and second images 120 and 130 performed by the merging processing portion 61a of this example makes it possible to obtain the result image as a clear image. In particular, it is possible to obtain the result image 180 as an image having the advantage of clear edges of the first image 120 and that of less noise of the second image 130 effectively merged therein.

Specifically, since the merging of the second and third images 130 and 140 is performed by use of differential values obtained from the second and third images 130 and 140, it is possible to make the result image 180 less reflect the subject motion blur contained in the second image 130 and less reflect the noise contained in the first image 120. Furthermore, since the merging of the first and fourth images 120 and 160 is performed by use of edge intensity values obtained from the third image 140, it is possible to make the result image 180 effectively reflect the clear edges of the first image 120 and less reflect the noise contained in the first image 120. As a result, the result image 180 can be obtained as an image that contains less blur due to camera shake or motion of a subject, thus having clear edges, and contains less noise.

Moreover, the third image generated by applying LPF processing to the first image 120 is used for calculating the edge intensity value, and this helps prevent noise contained in the first image 120 from causing the edge intensity value E(x, y) to be large in regions other than the edges.

Second Example

Figure 13:
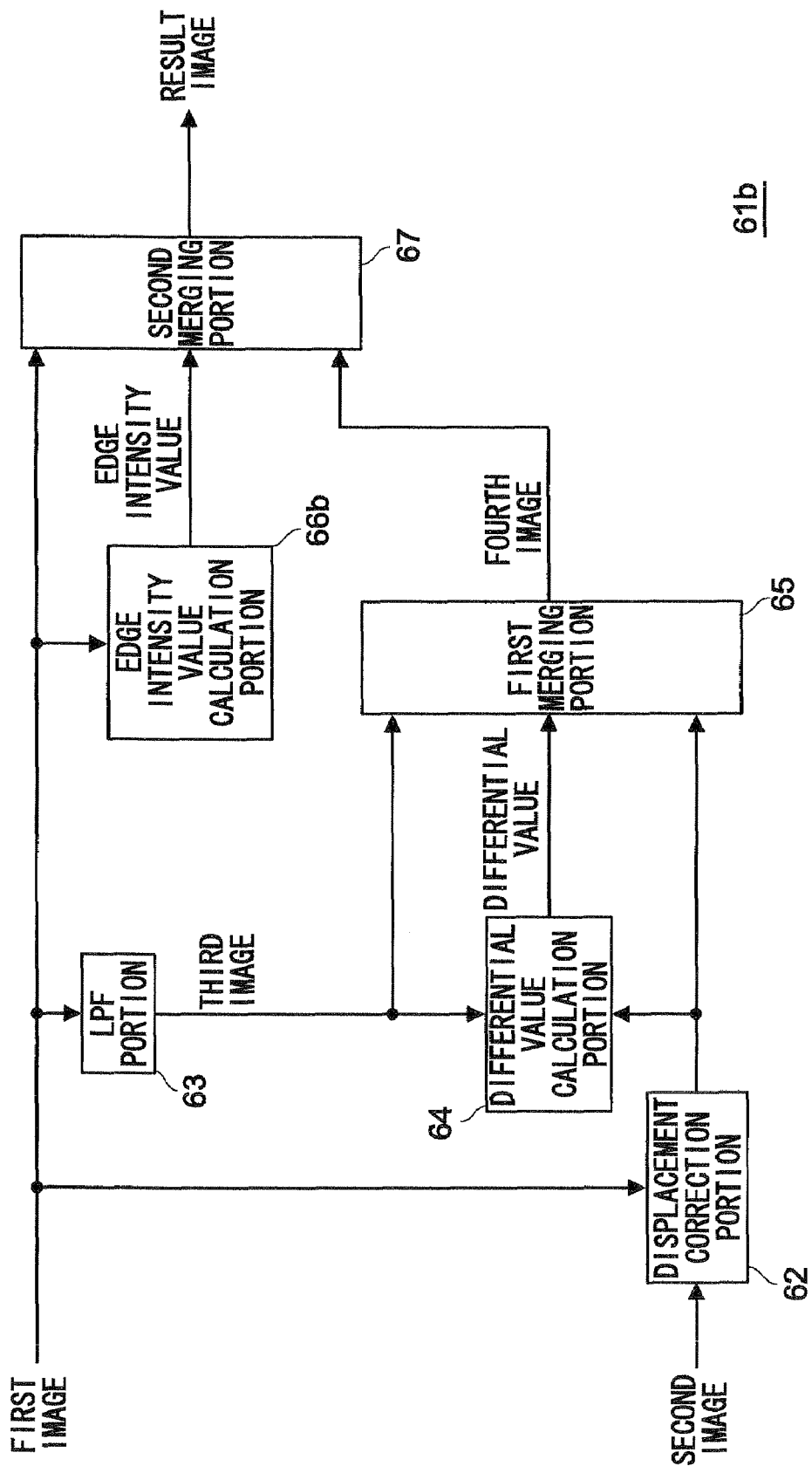
FIG. 13 is a block diagram showing the structure of a second example of the merging processing portion of the image shooting device embodying the present invention.

Next, the structure of a second example of the merging processing portion will be described with reference to FIG. 13. FIG. 13 is a block diagram showing the structure of the second example of the merging processing portion of the image shooting device embodying the present invention. Detailed descriptions of such parts as find their counterparts in the first example will be omitted, and detailed description will be given only of features that make the second example different from the first example.

As shown in FIG. 13, a merging processing portion 61b is provided with a displacement correction portion 62, an LPF portion 63, a differential value calculation portion 64, a first merging portion 65, and a second merging portion 67, which are similar to those in the first example. The merging processing portion 61b is also provided with an edge intensity value calculation portion 66b, but it is different from the edge intensity value calculation portion 66 in the first example. Specifically, the edge intensity value calculation portion 66b of this example calculates the edge intensity value E(x, y) according to the first image 120.

The operation of the merging processing portion 61b of this example is similar to that of the merging processing portion 61a of the first example except for the operation of calculating edge intensity values (this operation corresponds to STEP 6 in the first example, and hereinafter referred to as STEP 6b).

With this structure, the edge intensity value is more liable to reflect effect of noise as compared with in the first example. However, since the first image used here is not subjected to the LPF processing, edge intensity values clearly reflecting edges can be obtained, and this helps realize clearer edges.

Incidentally, in this example, it is possible to perform STEP 6b before STEPs 2 to 5, or to concurrently perform STEP 6b and STEPs 2 to 5.

Third Example

Figure 14:
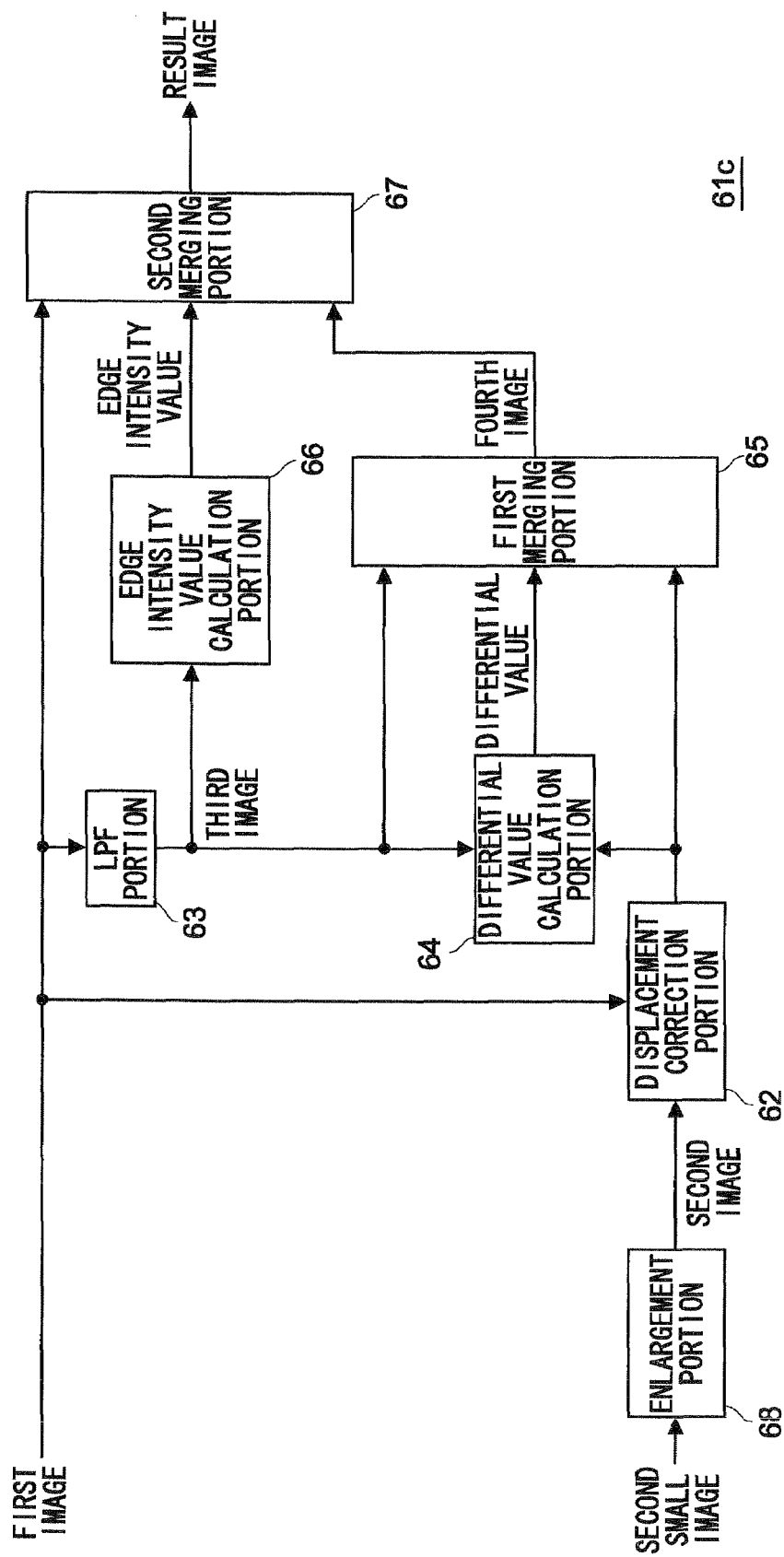
FIG. 14 is a block diagram showing the structure of a third example of the merging processing portion of the image shooting device embodying the present invention.

Next, the structure of a third example of the merging processing portion will be described with reference to FIG. 14. FIG. 14 is a block diagram showing the structure of the fourth example of the merging processing portion of the image shooting device embodying the present invention. Detailed descriptions of such parts as find their counterparts in the first example will be omitted, and detailed description will be given only of features that make the second example different from the first example.

As shown in FIG. 14, a merging processing portion 61c of this example is provided with a displacement correction portion 62, an LPF portion 63, a differential value calculation portion 64, a first merging portion 65, and a second merging portion 67, which are similar to those of the first example. However, the merging processing portion 61c of this example is provided with an enlargement portion 68 to which a second small image that is smaller than the second images in the first and second examples is fed, and that enlarges the second small image to generate and output a second image of a size similar to the sizes of the second images in the first and second examples (hereinafter "second image" as in the first and second examples, and in the description of this example, an image referred to simply as "second image" denotes this image). The second image obtained as a result of enlargement by the enlargement portion 68 is fed to the displacement correction portion 62 as in the first example, and then the same operation performed by the merging processing portion 61a of the first example is performed.

That is, the operation of the merging processing portion 61c of this example is similar to that of the merging processing portion 61a of the first example except for that processing of enlarging the second small image performed in the enlargement portion 68 (hereinafter STEP c) is performed between STEP 1 and STEP 2.

As the second small image, for example, can be used an image generated by performing pixel mixture on the second image in the first or second example (an image generated by mixing each plurality of neighboring pixels in the second image together to one pixel) or an image generated by thinning out a predetermined amount of pixels from the second image of the first or second example. It is also possible to generate these images directly in the image sensing portion 2 (for example, the mixing or thinning out of pixels has been already performed on an image when it is outputted from the image sensing portion 2). The enlargement portion 68 enlarges the second image, for example, by interpolating pixels into the second small image to generate the second image.

The second small image fed to the merging processing portion 61c of this example is smaller in size (i.e., having smaller amount of data) than the second images of the first and second examples fed to the merging processing portions 61a and 61b of the first and second examples. As a result, the amount of data in the image that is fed to the merging processing portion 61c can be reduced.

In a case where, as in this example, the second small image is fed to the merging processing portion 61c, the second image resulting from the second small image being enlarged by the enlargement portion 68 has low resolution and blurred edges. However, since the merging processing portion 61c of this example obtains clear edges from the first image, it is possible to obtain the merged image as a clear image as in the first and second examples described above.

As the edge intensity value calculation portion 66, the edge intensity value calculation portion 66b as in the merging processing portion 61b of the second example may be used. Furthermore, it is possible to perform STEP 3 before STEP c and STEP 2, or to concurrently perform STEP 3 and STEPs c and 2. Moreover, it is also possible to perform STEP 6 before STEP c and STEP 2, or to concurrently perform STEP 6 and STEPs c and 2, but in whichever case, STEP 6 should be performed after STEP 3.

Fourth Example

Figure 15:
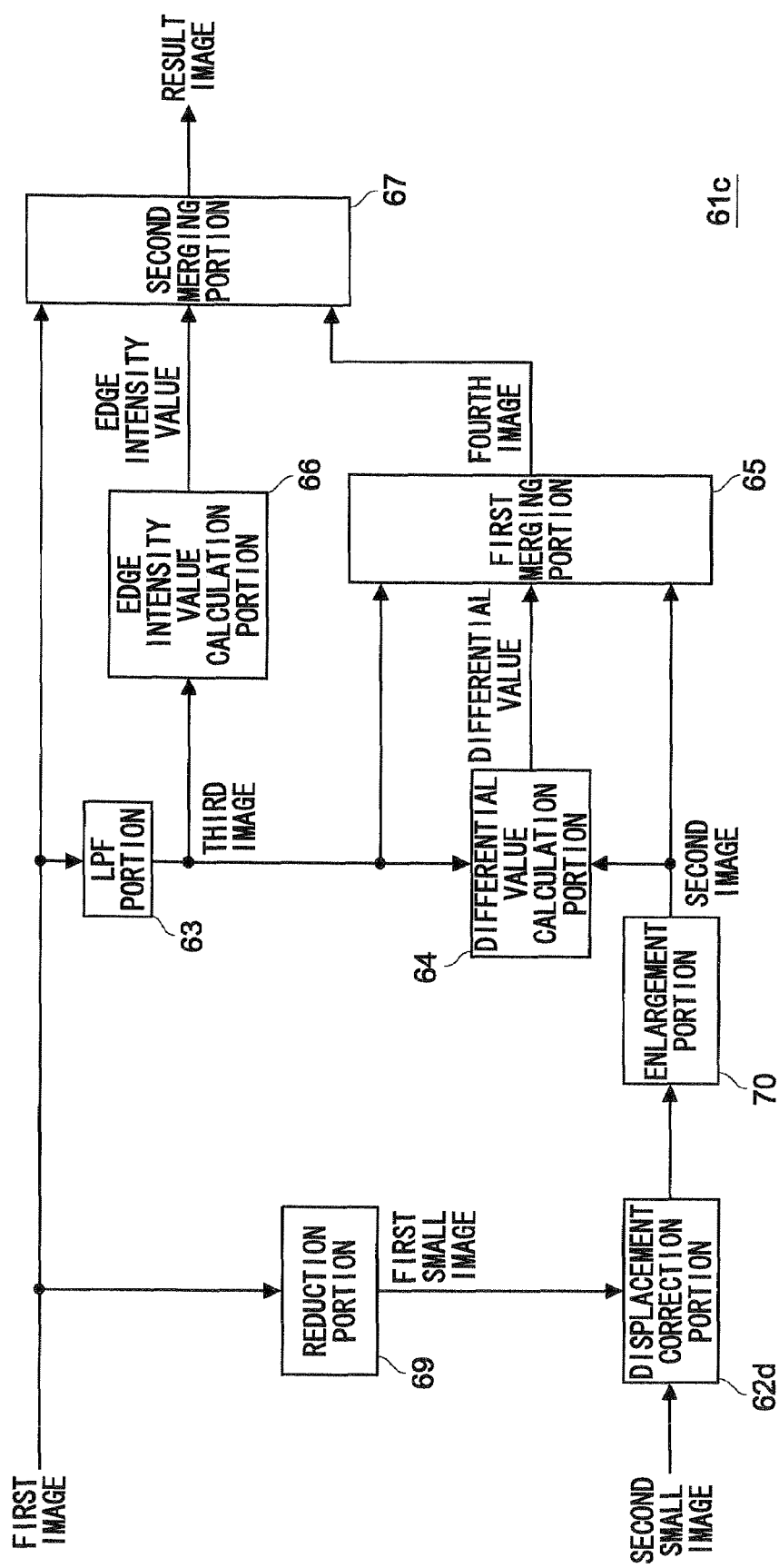
FIG. 15 is a block diagram showing the structure of a fourth example of the merging processing portion of the image shooting device embodying the present invention.

Next, the structure of a fourth example of the merging processing portion will be described with reference to FIG. 15. FIG. 15 is a block diagram showing the structure of the fourth example of the merging processing portion of the image shooting device embodying the present invention. Detailed descriptions of such parts as find their counterparts in the first example will be omitted, and detailed description will be given only of features that make the second example different from the first example.

As shown in FIG. 15, a merging processing portion 61d of this example is provided with an LPF portion 63, a differential value calculation portion 64, a first merging portion 65, an edge intensity value calculation portion 66, and a second merging portion 67, which are similar to those of the first example. Like the merging processing portion 61c of the third example, the first image and the second small image are fed to the merging processing portion 61d. And the merging processing portion 61d is further provided with: a reduction portion 69 that reduces the first image to generate an image (hereinafter, "first small image") having substantially the same size as the second small image; a displacement correction portion 62d that corrects displacement between the first small image outputted from the reduction portion 69 and the second small image; and an enlargement portion 70 that enlarges the second small image outputted from the displacement correction portion 62d to generate and output an image of a size similar to the sizes of the second images of the first and second examples (hereinafter "second image" as in the first and second examples, and in the description of this example, an image referred to simply as "second image" denotes this image).

The operation of the merging processing portion 61d of this example is similar to that of the merging processing portion 61a of the first example except for that processing of reducing the first image (hereinafter, STEP d-1) is performed in the reduction portion 69 between STEP 1 and STEP 2 shown in FIG. 3, that processing of correcting the displacement between the first and second small images (hereinafter, STEP 2d) is performed instead of STEP 2, and that processing of enlarging the second small image after the displacement correction (hereinafter, STEP d-2) is performed after STEP 2d and before STEP 4.

The reduction portion 69 generates the first small image, for example, by performing pixel mixture on the first image or by thinning out a predetermined pixel in the first image. The enlargement portion 70 enlarges the second small image, for example, by interpolating pixels into the second small image to generate the second image. The displacement correction portion 62d converts the coordinates of the pixels in the second small image so as to achieve pixel-to-pixel correspondence between the first image and the second image obtained as a result of the enlargement processing performed by the enlargement portion 70.

With this structure, an image on which displacement correction is performed by the displacement correction portion 62d can be made small. This helps reduce the amount of calculation and memory capacity necessary for displacement correction. Or instead, with a structure in which the second image obtained as a result of the enlargement performed by the enlargement portion 70 and the first image are merged together, a clear merged image can be obtained as in the third example.

The edge intensity value calculation portion 66b as in the merging processing portion 61b of the second example may be used as the edge intensity value calculation portion 66. Furthermore, in this example, it is possible to perform STEP 3 before STEP d-1, STEP 2d, and STEP d-2, or to concurrently perform STEP 3 and STEPs d-1, 2d, and d-2. Moreover, it is also possible to perform STEP 6 before STEP d-1, STEP 2d, and STEP d-2, or to concurrently perform STEP 6 and STEP d-1, STEP 2d, and STEP d-2, but in whichever case, STEP 6 should be performed after STEP 3.

Modified Example

In each of the merging processing portions 61a to 61d shown in FIG. 2 and 13 to 15, the first and second merging portions 65 and 67 are described as being formed separate from each other, but they may be integrally formed instead. In this case, the generation of the fourth image 160 may be omitted, and accordingly, STEP 5 in FIG. 3 may be omitted. That is, the three images of the first, second, and third images may be merged together at a time. In this case, the merging may be performed according to formula (5) below. Incidentally, formula (5) is obtained by substituting formula (2) into formula (4) to integrate the formulae (2) and (4) into one formula.

$$P(x, y) = \beta(x, y) \times P1(x, y) + \{1 - \beta(x, y)\} \times [\alpha(x, y) \times P2(x, y) + \{1 - \alpha(x, y)\} \times P3(x, y)] \quad (5)$$

The above descriptions deal with the merging processing portions 61a to 61d each structured with the LPF portion 63, but they may be structured without the LPF portion 63. In this case, the first, second, and third images are fed to the merging processing portions 61a to 61d.

The threshold values Th1_L and Th1_H that are used when the first merging portion 65 performs merging and the threshold values Th2_L and Th2_H that are used when the second merging portion 67 performs merging may be variable. For example, the threshold values Th1_L and Th1_H and the threshold values Th2_L and Th2_H may vary with the brightness of a region to be shot.

Specifically, when the region to be shot is dark (and thus a dark optical image is fed to the image sensing portion 2), the threshold values Th1_L and Th1_H and the threshold values Th2_L and Th2_H may be made large. When the region to be shot is dark, the sensitivity of the image sensor 3 is accordingly set high. As a result, noise, particularly in the first image 120, becomes noticeable. In such a case, by making the threshold values Th1_L and Th1_H and the threshold values Th2_L and Th2_H large as just described, it is possible to prevent the result image 180 from containing much of the noise contained in the first image 120.

The above-described merging processing by the merging processing portions 61a to 61d may be performed at any stage in the various kinds of the image processing performed in the image processing portion 6. For example, the first and second images may be subjected to image processing such as tone correction processing before they are fed to the merging processing portions 61a to 61d, or they may be fed to the merging processing portions 61a to 61d without being subjected to image processing.

Figure 16:
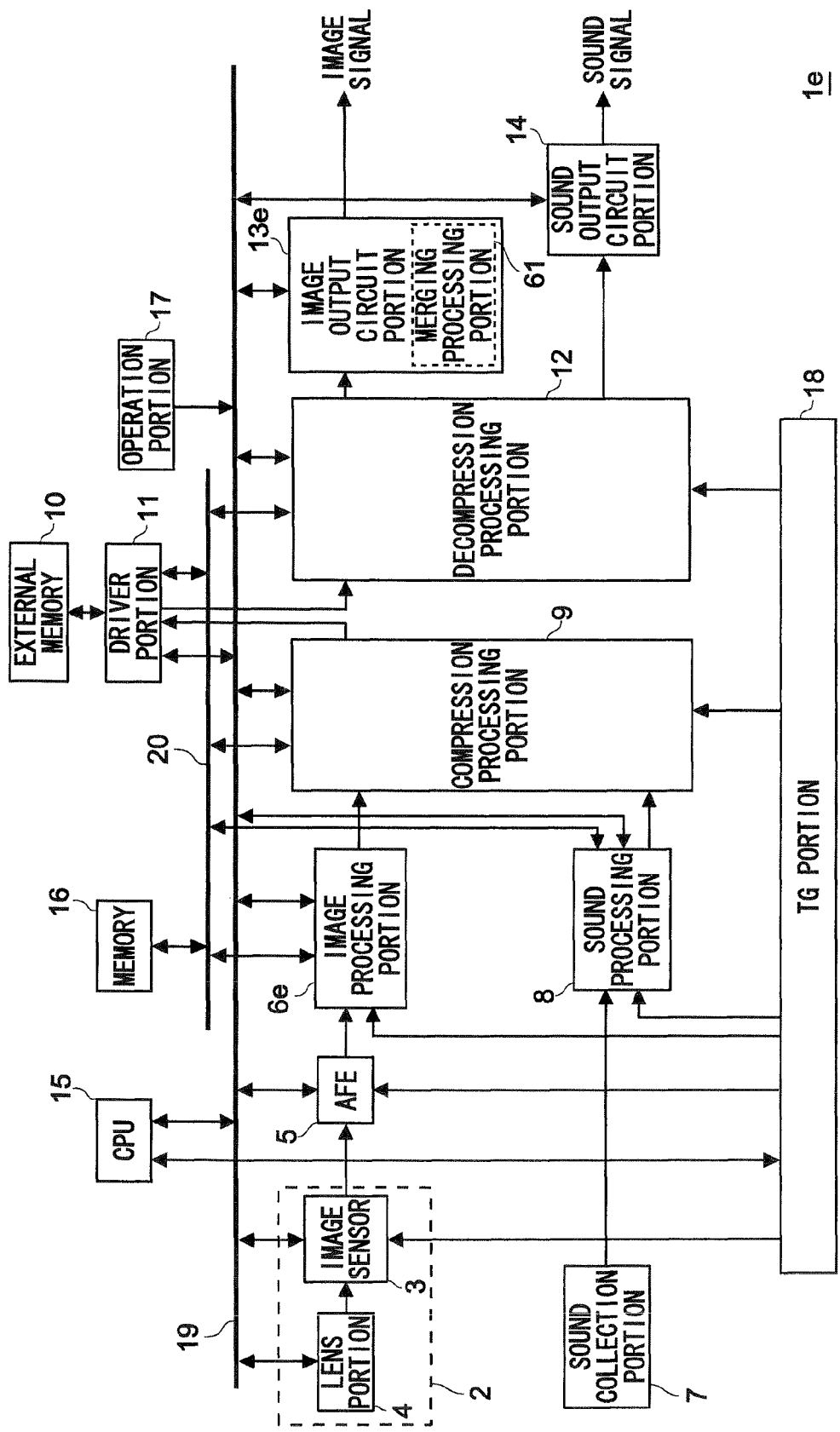
FIG. 16 is a block diagram showing the structure of another image shooting device embodying the present invention.

It is also possible to store a plurality of images to be merged together (such as the first and second images described above), for example, in the external memory 10, and merge the images together at the time of playback. This structure is illustrated in FIG. 16. FIG. 16 is a block diagram showing the structure of another image shooting device embodying the present invention.

In contrast to the image shooting device 1 shown in FIG. 1, an image shooting device 1e shown in FIG. 16 has a merging processing portion 61 in an image output circuit portion 13e, not in an image processing portion 6e. Except for this feature, the image shooting device 1e is structured in the same manner as the image shooting device 1 shown in FIG. 1, and thus the overlapping detailed description will be omitted. Here, as the merging processing portion 61, for example, the above described merging processing portions 61a to 61d may be used.

Thus, it is possible to store images to be merged together in the external memory 10 and merge the images together at the time of playback in the merging processing portion 61 provided on the playback side. Furthermore, this embodiment may be applied to a playback apparatus without an image sensing function and thus only capable of playback. Moreover, with this structure, use of the merging processing portion 61c of the third example as the merging processing portion 61 makes it possible to reduce the amount of data of the images before merging processing that is stored in the external memory 10.

In the image shooting devices 1 and 1e embodying the present invention, operation of portions such as the image processing portion 6, the image output circuit portion 13e, and merging processing portions 61a to 61d may be controlled by a control device such as a microcomputer. Furthermore, all or part of the functions realized by this control device may be prepared in the form of a computer program so that those functions—all or part—are realized as the computer program is executed on a program execution apparatus (for example, a computer).

In addition to the above-described case, the image shooting devices 1 and 1e shown in FIGS. 1 and 16 and the merging processing portions 61a to 61d shown in FIG. 2 and FIGS. 13 to 15 can be realized in hardware or in a combination of hardware and software. In a case where the image shooting devices 1 and 1e and the merging processing portions 61a to 61e are built with software, a block diagram showing the portions realized in software is a functional block diagram of these portions.

It should be understood that the embodiments specifically described above are not meant to limit the present invention, and that many variations and modifications can be made within the spirit of the present invention.

The present invention relates to an image processing device for processing an image inputted thereto and an image shooting device incorporating this image processing device. The present invention also relates to image processing method for processing an inputted image.

What is claimed is:

1. An image processing device, comprising:
    a merging portion that generates a merged image by merging together a first image obtained by shooting, a second image obtained by shooting with an exposure time that is longer than an exposure time with which the first image is shot, and a third image generated by filtering out a high-frequency component from the first image; and
    a differential value calculation portion that calculates a differential value between each pair of corresponding pixels in the second and third images and
    an edge intensity value calculation portion that extracts edges in an image based on the first image and calculates an edge intensity value of each pixel,
    wherein
        the merging portion determines a first merging ratio for each pixel according to the differential value, the first merging ratio being a merging ratio between the second and third images;
        the merging portion determines a second merging ratio of each pixel according to the edge intensity value, the second merging ratio being a merging ratio between the first image and the second and third images; and
        the merging portion generates the merged image by pixel-by-pixel merging processing based on the first and second merging ratios.

2. The image processing device according to claim 1, wherein
    the merging portion determines the first merging ratio such that a merging ratio of the second image is larger at a pixel where the differential value is smaller; and
    the merging portion determines the second merging ratio such that a merging ratio of the first image is larger at a pixel where the edge intensity is higher.

3. The image processing device according to claim 1, wherein
    the edge intensity value calculation portion calculates the edge intensity value according to the third image.

4. The image processing device according to claim 1, wherein
    the edge intensity value calculation portion calculates the edge intensity value according to the first image.

5. An image processing device, comprising:
    a merging portion that generates a merged image by merging together a first image obtained by shooting, a second image obtained by shooting with an exposure time that is longer than an exposure time with which the first image is shot, and a third image generated by filtering out a high-frequency component from the first image; and
    an enlargement portion that enlarges a second small image that is an image smaller than the second image to generate and output the second image,
    wherein
        the merging portion merges the first image, the second image outputted from the enlargement portion, and the third image together to generate a merged image.

6. An image processing device, comprising:
    a merging portion that generates a merged image by merging together a first image obtained by shooting, a second image obtained by shooting with an exposure time that is longer than an exposure time with which the first image is shot, and a third image generated by filtering out a high-frequency component from the first image; and
    an enlargement portion that enlarges a second small image that is an image smaller than the second image to generate and output the second image,
    a reduction portion that reduces the first image to be substantially a size of the second small image to generate and output a first small image;
    a displacement correction portion that compares the first and second small images, converts coordinates of pixels in the second small image, and achieves pixel-to-pixel correspondence between the second image outputted from the enlargement portion and the first image,
    wherein
        the merging portion merges the first image, the second image outputted from the enlargement portion, and the third image together to generate a merged image.

* * * * *